UNITED STATES PATENT OFFICE.

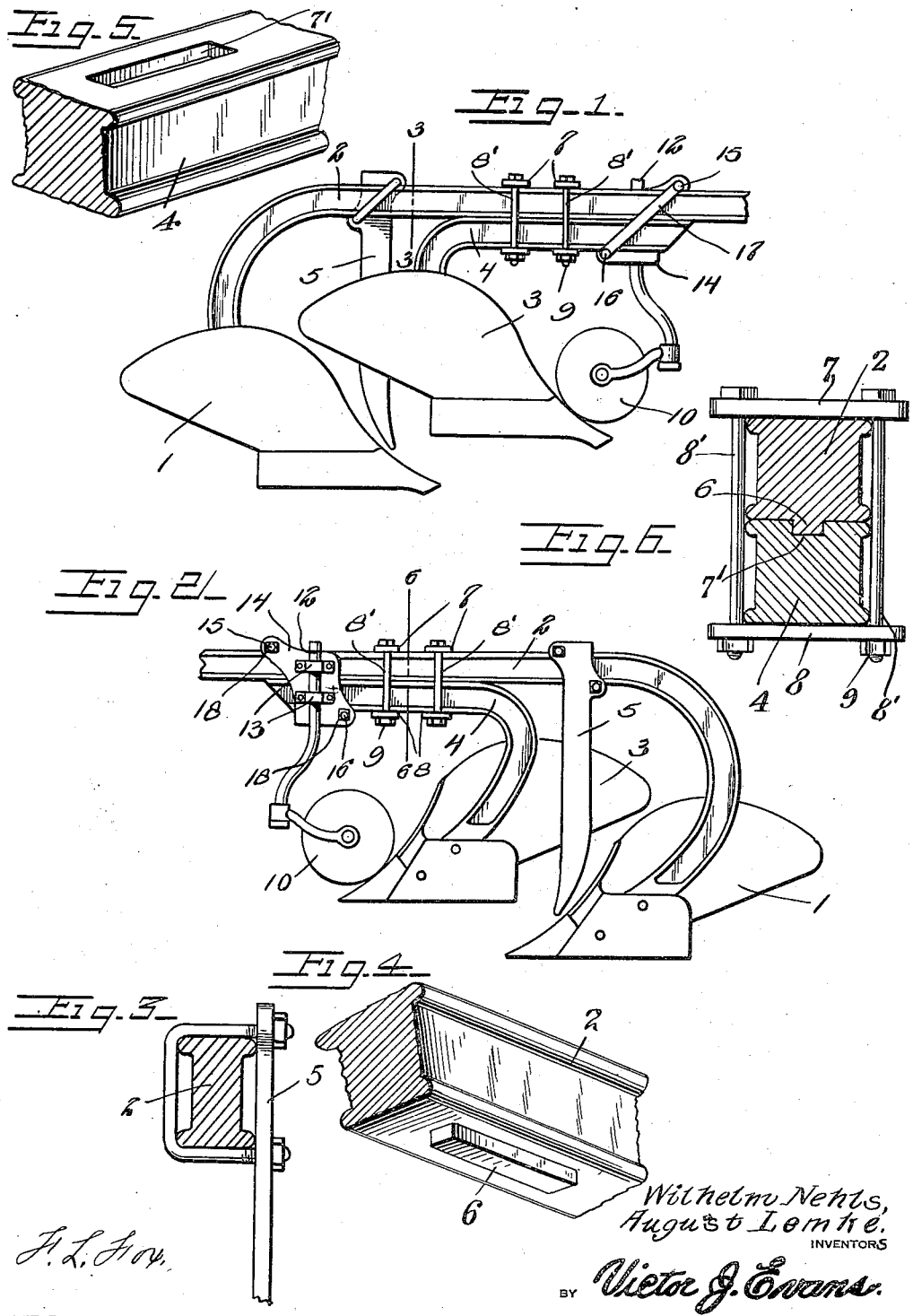

WILHELM NEHLS AND AUGUST LEMKE, OF MAZEPPA, MINNESOTA.

PLOW ATTACHMENT.

1,425,409.   Specification of Letters Patent.   Patented Aug. 8, 1922.

Application filed August 9, 1920. Serial No. 402,140.

*To all whom it may concern:*

Be it known that we, WILHELM NEHLS and AUGUST LEMKE, citizens, respectively, of Germany and the United States, residing at Mazeppa, in the county of Wabasha and State of Minnesota, have invented new and useful Improvements in Plow Attachments, of which the following is a specification.

The present invention has reference to improvements in plows, and may be considered in the nature of an attachment for an ordinary plow.

The object is the provision of two turning plows, one arranged directly in advance of the other, both plows turning the soil, the rear plow turning the subsoil over the soil turned by the plow in advance thereof, so that all foreign growth will have the rooted portions thereof projected upwardly, and thus effectively destroyed in a single plowing operation.

A further object is the provision of means of connecting two plows so that one of the plows will be effectively supported upon the other.

A further object is the production of means whereby the beams of two plows are effectively connected to permit one of the plows being arranged directly in front of the other plow, and at an elevation with respect to the said other or rear plow, and also whereby a rotary colter may be attached and the attaching means providing additional securing means for the beams of the plows.

The foregoing, and other objects which will appear as the nature of the invention is better understood, may be accomplished by a construction, combination and operative arrangement of parts, such as is disclosed by the drawings.

In the drawings:—

Figure 1 is a side elevation of the improvement.

Figure 2 is an elevation looking toward the opposite side of the plow beams and showing the manner in which the rotary colter is attached thereto.

Figure 3 is a greatly enlarged sectional view approximately on the line 3—3 of Figure 1.

Figure 4 is a fragmentary perspective view looking toward the under face of the beam of the main rear plow.

Figure 5 is a similar view of the beam of the forward or auxiliary plow.

Figure 6 is a sectional view approximately on the line 6—6 of Figure 2.

The rear plow share is indicated by the numeral 1, and is of the ordinary construction and supported upon the curved end of the ordinary beam 2. The forward plow share is indicated by the numeral 3 and is supported on the rounded end of a comparatively short beam 4. The rounded end of the beam 4 is of a less length than that of the beam 2, so that the front plow 3 will be held elevated with respect to the rear plow 1, when the plow beams are connected in a manner which will presently be described. Between the plow shares 1 and 3 there is secured to the beam 2 a knife colter 5. The under face of the beam 2 is either formed or has secured thereto a centrally arranged depending tongue 6, and the outer face of the beam 4 is provided with a socket 7' to receive the said tongue 6. Arranged transversely over the beam 2 and under the beam 4 are spaced plates 7 and 8 respectively. Passing through openings in the said plates and contacting with the sides of the beams 2 and 4 are bolt members 8'. These bolts are engaged by nuts 9.

Secured to the sides of the beam, opposite that to which the plow shares are connected is a rotary colter 10. This colter, is provided with the usual mount that includes the standard 12 that is engaged between clips 13 provided on a plate 14. The plate 14 is arranged angularly with respect to the standard 12, or rather the said plate may have its edges cut at an angle and the said plate 14 is of a length greater than the combined thicknesses of the beams 2 and 4. Passing transversely through the projecting ends of the plate are diagonally arranged bolts 15 and 16 and also passing through the angularly arranged plate 17 on the opposite side of the plow beams. These bolts are engaged by nuts 18. The plates 14 and 17, contacting the opposed sides of both of the beams, and the bolts 15 and 16 contacting with the upper and lower faces of the respective beams 2 and 4, effectively sustain the beam 4 on the beam 2.

It is believed that the construction and operation of the improvement will be perfectly apparent to those skilled in the art of soil treating. It will be apparent that a furrow will be made by the plow share 3, the rotary colter, of course, assisting the plow in its work.

The subsoil is engaged by the share 1 and is turned over thereby, so that the roots of foreign growth will be turned upwardly and consequently such growth will be effectively destroyed in the plowing operation.

Having thus described the invention, what we claim is:—

Two plow shares arranged one in advance of the other, and the forward share elevated above the rear share, a beam for each share, the beam for the rear share resting on the beam for the forward share, said first mentioned beam having on its lower face a longitudinal tongue, and the second beam having on its upper face a socket in which the tongue is received, a plate arranged against one of the sides of the beams, said plate being of a length greater than the combined thickness of the beams, a U-bolt straddling the beams and passing through diagonally opposed openings in the plate, nuts engaging the arms of the U-bolt for forcing the same and the plate against the beams, plates disposed transversely over the upper and lower faces of the beams, and adjustable means connecting said plates and in contacting engagement with the sides of the beams.

In testimony whereof we affix our signatures.

WILHELM NEHLS.
AUGUST LEMKE.